Nov. 23, 1954     D. F. GRASSER     2,694,876
FISH LURE
Filed June 16, 1952
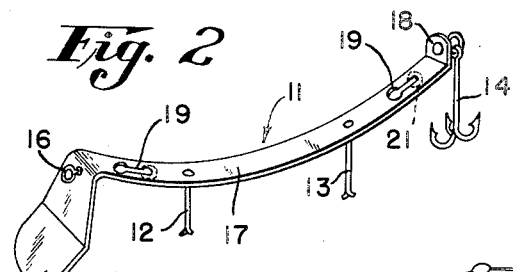
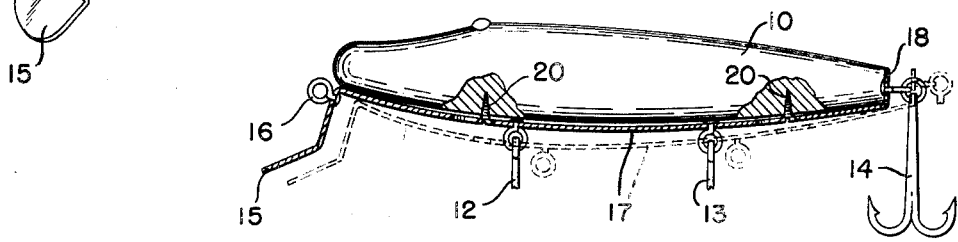
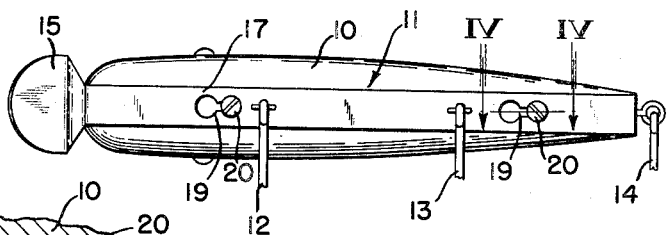
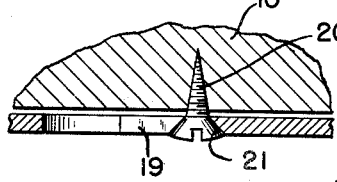
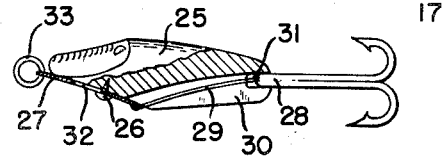
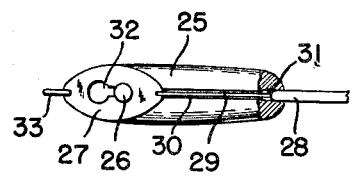
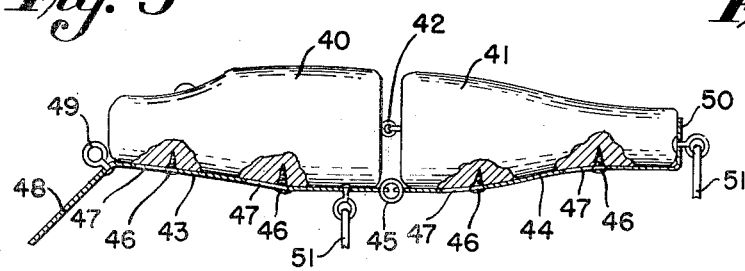
INVENTOR.
DONALD F. GRASSER
BY
ATTORNEY.

United States Patent Office 2,694,876
Patented Nov. 23, 1954

2,694,876

FISH LURE

Donald F. Grasser, Grosse Pointe Woods, Mich.

Application June 16, 1952, Serial No. 293,745

2 Claims. (Cl. 43—42.09)

This invention relates generally to fish lures and more particularly to lures or artificial bait of the so-called "plug" type.

When fishing with artificial bait, it is often desirable to alter the appearance of the lure by substituting plugs of different sizes, shapes or colors to obtain the most effective results. For practical reasons it is essential that such substitution be accomplished with speed and facility.

Therefore an important object of this invention is to provide a fish lure including a hook carrying member or assembly to which any one of several various shaped or colored plugs or bodies may be quickly and easily attached or detached whereby the character of the bait may be readily altered when necessary or desirable.

Another object of the invention to to provide a fish lure which is of simple construction and comprises a minimum of parts whereby it may be economically manufactured and thus sold at reasonable prices.

The several objects, advantages, and novel details of construction of the invention will become more apparent as this description proceeds, reference being made to the accompanying drawing wherein:

Figure 1 is a side elevational view, partly in section, illustrating a fish lure embodying the features of this invention, Figure 2 is a detail perspective view of the hook assembly member, Figure 3 is a bottom plan view of the structure shown in Figure 1, Figure 4 is an enlarged fragmentary sectional view taken substantially on the plane indicated by line 4—4 in Figure 3, Figure 5 is a side elevational view, partly in section, of a modified form of construction, Figure 6 is a bottom plan view, partly in section, of the modification shown in Figure 5, and Figure 7 is a side elevational view, partly in section, of another modified form of construction.

Referring to the drawings and particularly to Figures 1 to 4 inclusive thereof, the lure includes a plug type body 10 and a hook carrying member or assembly 11 from which any number and type of fish hooks, such as indicated at 12, 13 and 14 may be suspended. If desired a spoon 15 may be provided at the forward end of the member 11 and the lure is attached to a fishing line by the usual leader which connects with the swivel eye 16. The body 10 may be made of any suitable material, such as wood, and may be made in any desired shape and of any color calculated to attract the type of fish being sought. With this invention any number of bait bodies of different sizes, shapes and colors may be provided for selective assembly with the hook carrying member 11 for varying the character of the bait as mentioned heretofore.

The body of the hook carrying member 11 is formed of a strip 17 of inherently resilient material such as sheet metal, normally bowed or curved longitudinally as shown in Figure 2 and as further shown in dotted lines in Figure 1. As will be clear from the latter figure, the normal radius of curvature of the strip is different from that of the adjacent surface of the body 10. The spoon 15 may be formed on one end of the strip 17 and the other end thereof is provided with an angularly extending abutting portion 18 adapted to engage the end of the body 10 in the assembled position of the parts.

The resilient strip 17 is provided with one or more keyhole slots 19 adapted for engagement with the heads of headed fastening elements such as screws 20 rigidly secured to and projecting from the body 10. The rearward faces of said heads may be of coniform shape, as shown in Figs. 1 and 4, and the smaller end of each keyhole slot provided with a countersink 21 to receive and seat such coniform portion of the head of its engaging element 20. When the parts are assembled as shown in Figure 1, the strip 17, because of its normally bowed configuration, is biased in a direction away from the body 10 into frictional locking engagement with the headed elements 20.

To assemble the body and hook carrying member the intermediate portion of the strip 17 is stressed or pressed toward the body 10 to flatten the strip sufficiently to engage the larger ends of the keyhole slots 19 with the headed elements 20. The parts are then moved lengthwise relatively to one another to position the headed elements in the smaller ends of the slots whereupon the heads of the elements 20 engage the countersinks 21. In flattening the resilient normally bowed strip 17 the ends thereof engage the body 10 and upon release of the pressure upon it the intermediate portion tends to spring away from the body (as shown in full lines in Fig. 1) and thus is biased in a direction to frictionally lock the hook carrying member 11 to the body 10 through the headed elements 20. To disengage the parts the intermediate portion of the strip 17 is pressed against the body 10 and the strip moved lengthwise relatively thereto to disengage the headed elements 20 from the slots 19. However, due to the camming action of the coniform heads of the fastening elements, the strip may be assembled and disassembled merely by manual movement of the strip longitudinally of the body as in the assembly the cam surfaces of the fastening element heads exert pressure on the nearest portion of the boundary edges of the smaller portions of the keyhole slots to provide sufficient flattening of the strip to permit entry of the fastening elements into such smaller slot portions. In this manner bodies of different types may be assembled with the hook carrying member as desired. The pull of the fishing line connected to the swivel eye 16 is in a direction tending to hold the headed elements in the small ends of the slots 19 and the abutting end 18 against the end of the body 10.

In the modification shown in Figures 5 and 6 the reference character 25 indicates the body of the lure having a headed element 26 projecting therefrom. The hook carrying member or assembly consists of a normally bowed or dished resilient plate member 27, a fish hook having a preferably cylindrical shank 28 and a wire or rod 29 connecting the plate member 27 to the shank 28 of the hook. The body 25 is provided with a longitudinally extending slot 30 which connects with a circular recess or bore 31 located at the rear end of the body 25. The plate member 27 is formed with a keyhole slot 32 for interlocking engagement with the headed element 26 in the assembled position of the parts.

In assembling a body 25 with the hook carrying member the shank 28 of the hook is engaged in the recess 31, the rod 29 is moved into the slot 30, and the plate member 27 is pressed against the body to engage the keyhole slot 32 with the headed element 26. The plate member 27 is then shifted relative to the body to locate the headed element in the smaller end of the keyhole slot and the parts assume the position illustrated in Figures 5 and 6 with the plate member 27 biased into locking engagement with the headed element 26. The pull of the fishing line connected to the eye 33 tends to further hold the parts in their assembled relation.

In the modification illustrated in Figure 7 the lure body is formed in two parts 40 and 41 with a universal connection 42 therebetween, this being a type of artificial bait sometimes used. The hook carrying member or assembly consists of two sections 43 and 44, each substantially the same as the strip 17 of the preferred form of the invention. These sections 43 and 44 are provided with a universal connection 45. The body sections 40 and 41 are each provided with headed elements 46 adapted for engagement with keyhole slots 47 formed in the sections 43 and 44 of the hook carrying member.

The forward section 43 may be provided with a spoon portion 48 and an eye 49 to which the fishing line is connected and the rear end of the section 44 is preferably formed with an angularly extending part 50 adapted to engage the adjacent end of the body part 41. The reference character 51 indicates fish hooks, any number of which may be provided.

What is claimed is:

1. A fish lure comprising an elongated longitudinally curved plug type body having a pair of axially spaced headed fastening elements projecting transversely therefrom intermediate its ends, and a hook-carrying member readily detachably secured to said body, such member comprising a longitudinally bowed resilient metallic strip extending lengthwise of the body and having a normal radius of curvature less than that of the portion of the body surface it is adapted to cover when in fixed position thereon and said strip being provided with a pair of keyhole slots located inwardly from the respective ends thereof, which slots have smaller portions that receive the respective headed fastening elements in the assembled positions of the parts, said strip being pressed toward and moved longitudinally of the body surface to effect assembly thereon and in such assembled relation having only its end portions in engagement with the body surface while the intermediate portion of the strip bows outwardly from such surface to resiliently frictionally engage the headed fastening elements with the boundaries of said smaller portions of the keyhole slots, the spacing of said intermediate portion of the strip from the body surface providing for ready disassembly of the parts through pressure upon such intermediate portion to flatten it against the body to relieve said frictional engagement between the fastening elements and slot boundaries, whereupon the strip may be slid longitudinally of the body to register the larger portions of the slots with said fastening elements for disengagement therefrom.

2. A fish lure comprising an elongated longitudinally curved plug type body provided with a pair of axially spaced fastening elements having headed portions projecting transversely from the body intermediate its ends, which headed portions have rearward coniform faces constituting cam surfaces; and a hook-carrying member readily detachably secured to said body, such member comprising a longitudinally bowed resilient metallic strip extending lengthwise of the body and having a normal radius of curvature less than that of the portion of the body surface which it is adapted to cover when in fixed position thereon, said strip being provided with a pair of keyhole slots located inwardly from the respective ends of the strip and having smaller portions receiving the respective fastening elements in the assembled position of the parts, said strip being moved longitudinally of the body to effect the assembly during which movement said coniform cam surfaces of the fastening element heads exert pressure on the nearest portions of the boundary edges of said smaller portions of the keyhole slots to provide a flattening of the strip and permit entry of the fastening elements into such slot portions, and said strip when in said assembled position having only its end portions in engagement with the body surface while the intermediate portion of the strip bows outwardly from such surface to maintain frictional engagement between the fastening element heads and the boundaries of the smaller ends of the keyhole slots to prevent unintentional disassembly of the parts.

References Cited in the file of this patent

UNITED STATES PATENTS

| Number | Name | Date |
|---|---|---|
| 810,017 | Ackerman | Jan. 16, 1906 |
| 895,483 | Metcalf | Aug. 11, 1908 |
| 921,566 | Schlechter | May 11, 1909 |
| 2,036,884 | Reeves | Apr. 7, 1936 |
| 2,088,320 | DeVries | July 27, 1937 |
| 2,517,157 | Adams | Aug. 1, 1950 |
| 2,604,716 | Hair, Jr. | July 29, 1952 |
| 2,611,210 | Clark | Sept. 23, 1952 |
| 2,621,357 | Stuman | Dec. 16, 1952 |